July 20, 1926.
P. J. McMANAMAN ET AL
1,593,340
AUTOMOBILE SIGNAL
Filed June 27, 1924     5 Sheets-Sheet 1
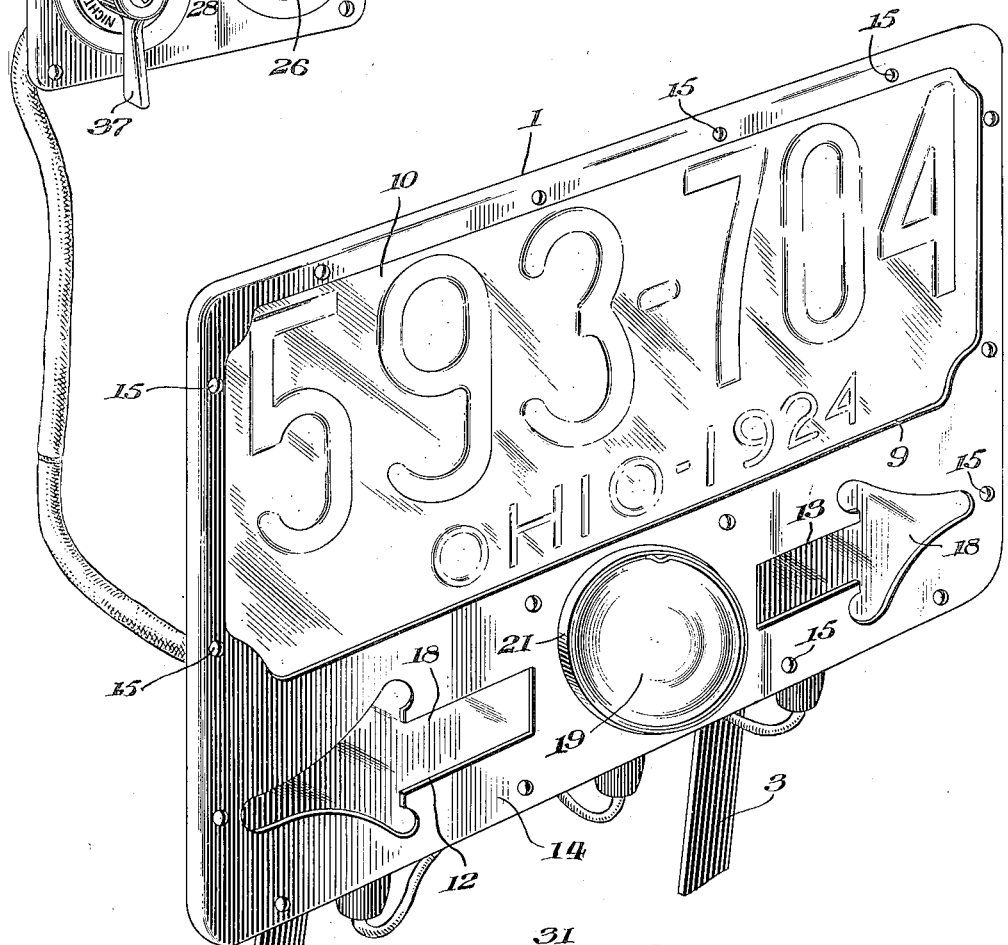

July 20, 1926.
P. J. McMANAMAN ET AL
1,593,340
AUTOMOBILE SIGNAL
Filed June 27, 1924
5 Sheets-Sheet 2
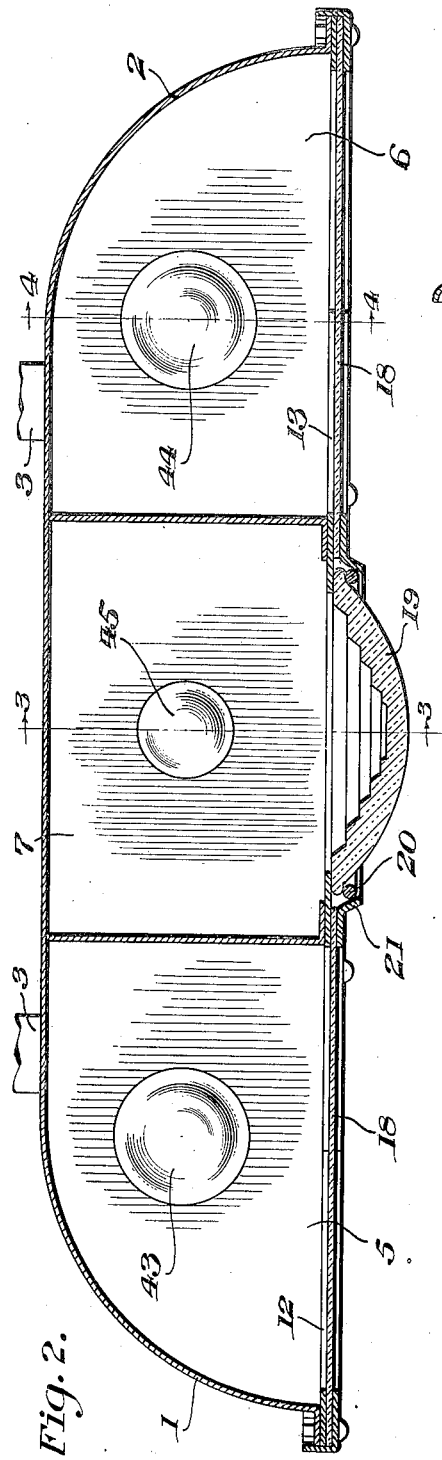
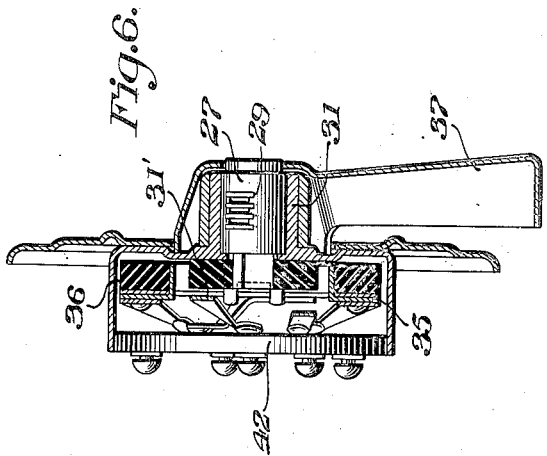
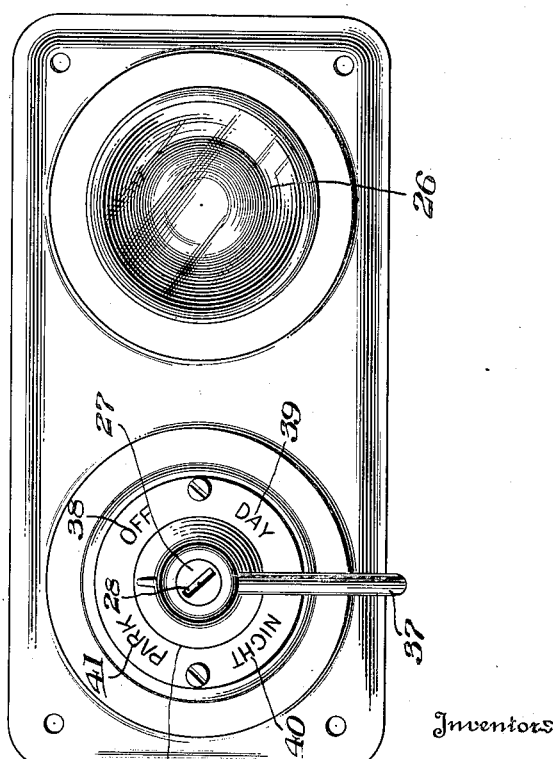

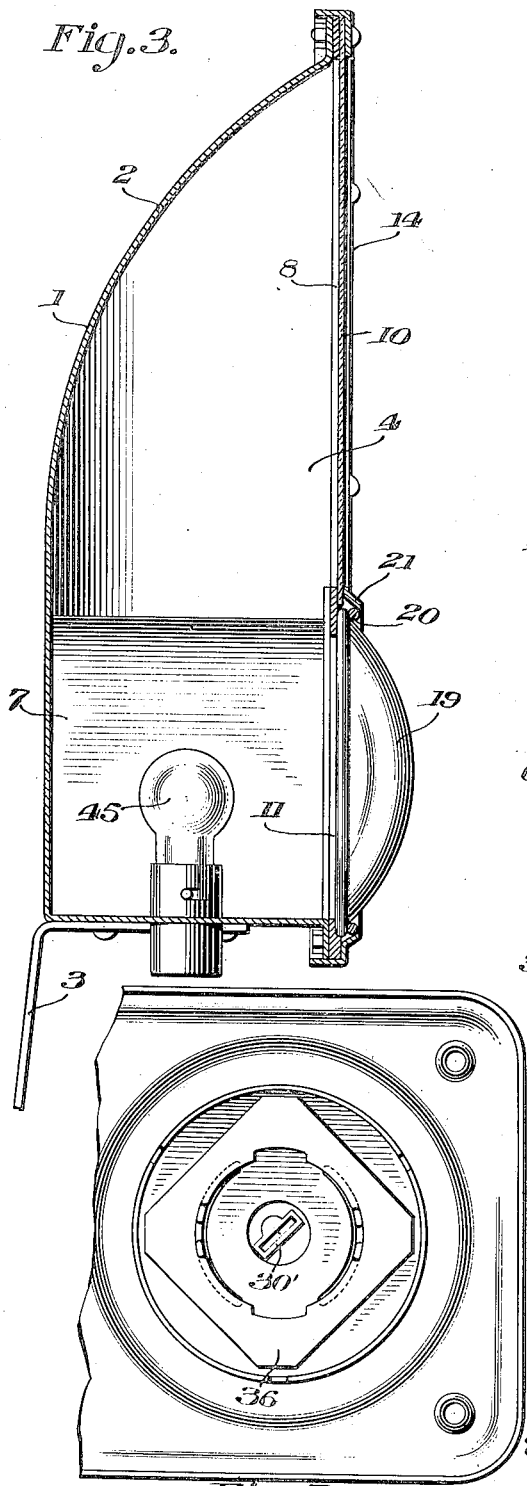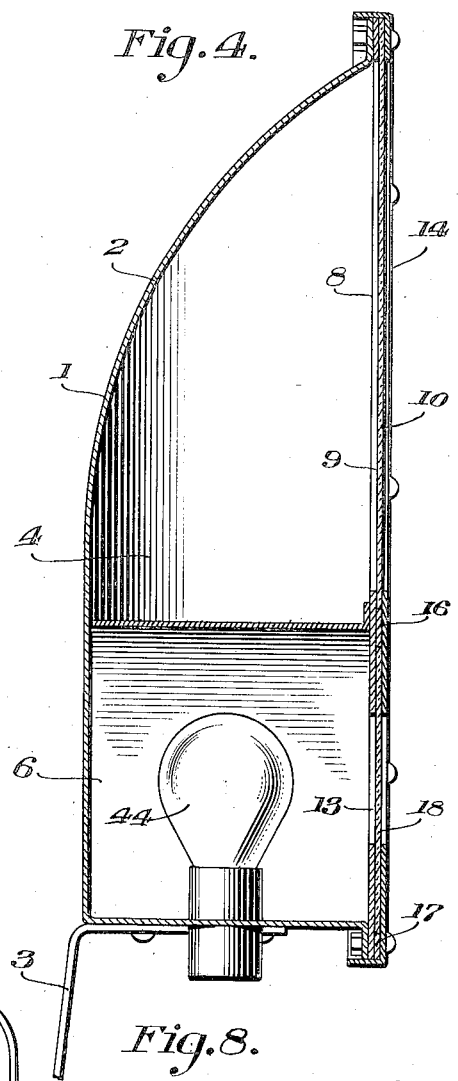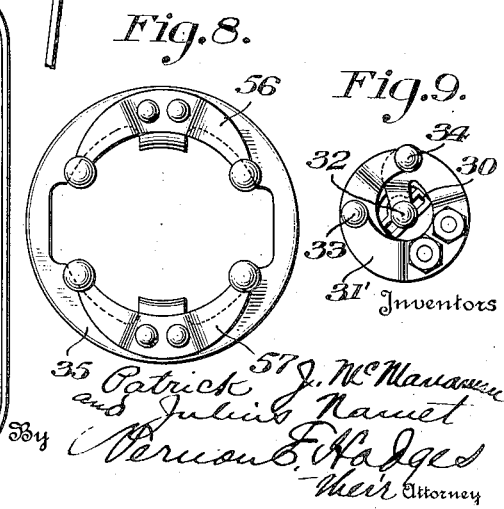

July 20, 1926.
P. J. McMANAMAN ET AL
1,593,340
AUTOMOBILE SIGNAL
Filed June 27, 1924
5 Sheets-Sheet 4
Fig.11.
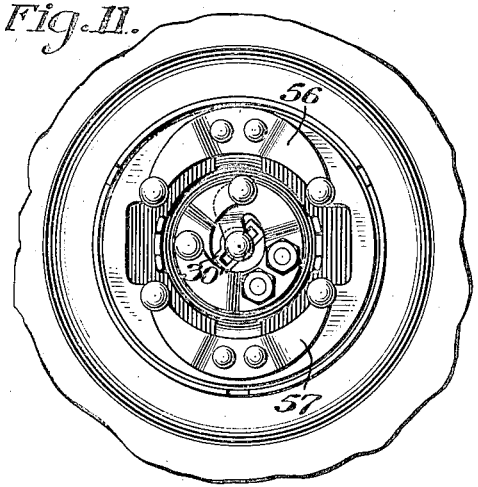
Fig.12.
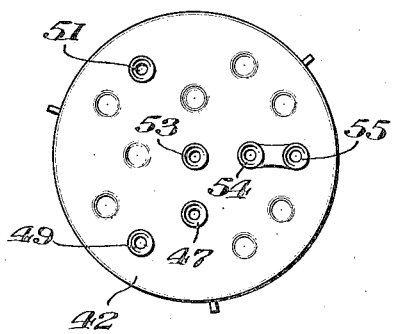
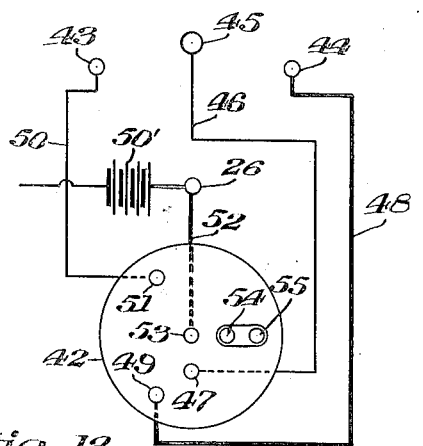
Fig.13.
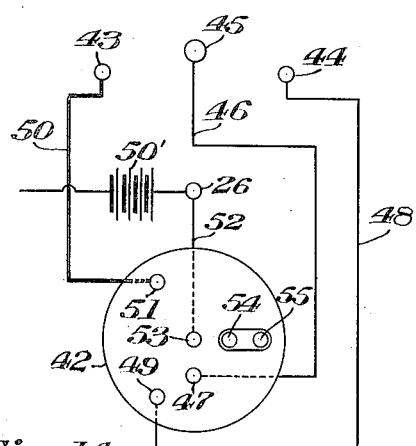
Fig.14.
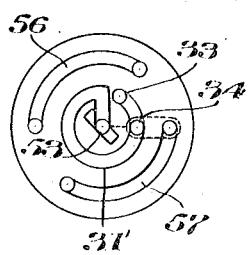
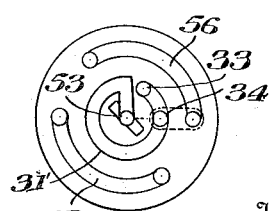
Inventors
Patrick J. McManaman
and Julius Namet
By Vernon E. Hodges
their Attorney

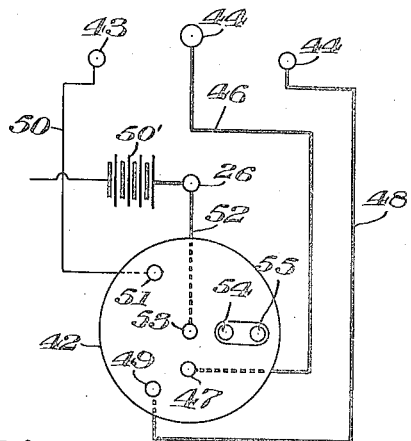
Fig.15.
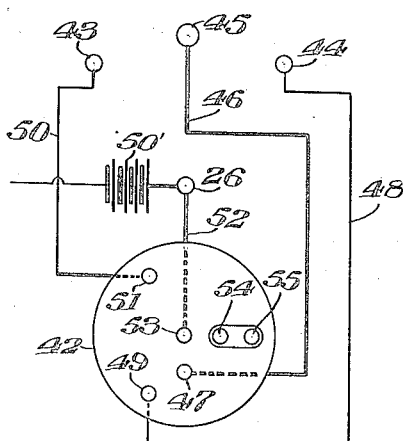
Fig.16.
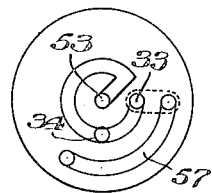
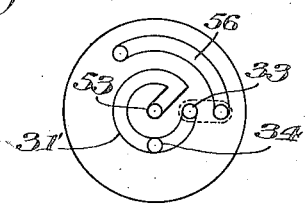
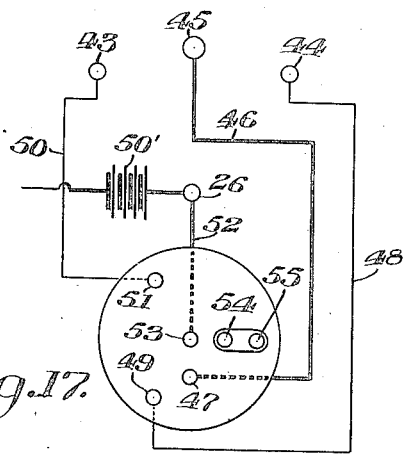
Fig.17.
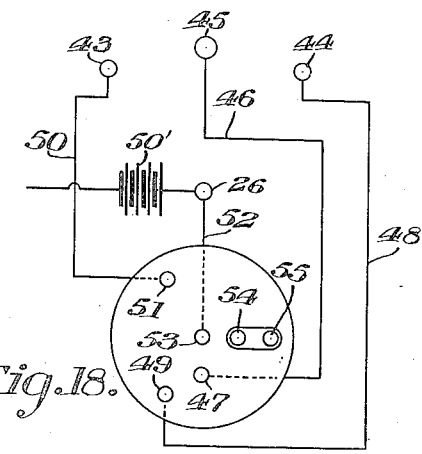
Fig.18.
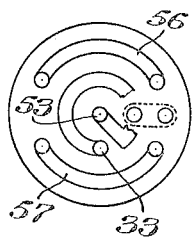
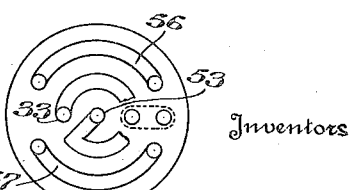

Patented July 20, 1926.

1,593,340

UNITED STATES PATENT OFFICE.

PATRICK J. McMANAMAN AND JULIUS NAMET, OF CLEVELAND, OHIO.

AUTOMOBILE SIGNAL.

Application filed June 27, 1924. Serial No. 722,741.

This invention relates to an improved electrically controlled indicator and signal for automobiles.

The object of this invention is to produce a signal of this character whereby the proposed direction of movement of the vehicle will be visibly indicated to drivers of cars following.

A further object of the invention is to arrange a pilot light in the circuits in such a manner that the operator may ascertain whether or not the different signals are operating.

A further object is to arrange the license-plate in such a manner as to be illuminated by the same light that illuminates the tail-light.

A further object of this invention is to arrange the circuit so that the tail-light is illuminated when desired, and the direction indicating arrow lights when illuminated will be in series with the tail-light.

A further object of the invention is to so arrange the circuit that the tail-light may be illuminated for parking purposes, at which time the direction arrow lights are not being illuminated.

In the accompanying drawings:—

Fig. 1 is a diagrammatic perspective view of the invention showing the relative position of the parts when applied to an automobile;

Fig. 2 is a horizontal section through the lower compartments;

Fig. 3 is a transverse section on line 3—3 of Fig. 2;

Fig. 4 is a transverse vertical section on line 4—4 of Fig. 2;

Fig. 5 is a front elevation of the switch and pilot-light;

Fig. 6 is a vertical section through the switch;

Fig. 7 is a rear view of the switch panel with portions of the switch removed;

Fig. 8 is a plan view of one of the rotatable contact members;

Fig. 9 is a plan view of another of the rotatable contact members;

Fig. 10 is an enlarged transverse sectional view through the locking mechanism of the switch;

Fig. 11 is a rear plan view of the switch with the contact disk removed;

Fig. 12 is a detail face view of the disk carrying the contact points;

Figs. 13 to 18 inclusive are electrical diagrams showing the respective positions of the switch when completing the different circuits.

The preferred embodiment of our invention includes a rear signal and tail-light and license-tag support indicated as a whole by the numeral 1, and adapted to be attached at any suitable point to a vehicle. The housing 2 consists of a body portion supported on suitable brackets 3, said body portion being divided into an upper compartment 4 and lower lateral compartments 5 and 6, the upper compartment communicating with a central lower compartment 7. The front of the housing 2 is provided with a face-plate 8, which has an opening 9 in the upper portion thereof adapted to receive the license-plate 10, and an opening 11 communicating with the lower compartment 7, and openings 12 and 13 which communicate with the lateral compartments 5 and 6. The latter openings are in the form of arrows pointing to the right and left respectively. Placed over the face-plate 8 is a similar plate 14, which has openings which correspond to the openings mentioned as contained in the face-plate 8. The outer edge of this plate 14 is adapted to be bent over upon the edge of the housing, and the first-mentioned face-plate 8, and is secured in place by a plurality of screws 15. The license-plate 10 is confined between the two mentioned plates 8 and 14. Running longitudinally between the front and rear plates 8 and 14 are longitudinal strips 16 and 17 which form guide-ways for the transparent strips 18 of celluloid or other suitable material which serve to cover the arrow-openings 12 and 13, and which may be of any desired color, but preferably red.

These strips 18 are held in place by the insertion of the lens 19 which is inserted in the opening of the lower compartment 7, the latter being held in place by the usual ring 20 received in the flange portion 21 of the opening. In this manner by the removal of the lens 19, the transparent strips 18 may be removed, if desirable.

The license-plate may be of any suitable material, but is preferably made of celluloid or bakelite or other transparent moldable material with the letters embossed, the background and molded letters being of the appropriate color to meet the requirements of the different States.

Mounted in the lateral compartments 5 and 6 and in the lower compartment 7 are suitable lights 43, 44 and 45. These lights are all controlled by a switch 25 mounted on the dashboard. Included with this switch on the dash-board is a pilot-light 26.

The switch 25 is preferably constructed in the following manner:—The switch in reality is a combined lock and switch, the lock portion consisting of the usual cylindrical barrel 27 having the usual slot 28 for the reception of the key, and the usual transverse tumblers 29, which are actuated by the key. These members 29 are adapted to register with a plurality of openings 30 in a bushing 31 which surrounds the cylindrical sleeve 27 which holds the members 29 in their respective positions. The rear of this member 27 is reduced into a rectangular tongue 30' upon which is received a circular insulated disk 31' which carries a switch consisting of three contact members 32, 33 and 34. Surrounding the insulated member 31' is a similar metallic circular member 35 mounted upon an insulating member 36 which in turn is adapted to be rotated by a suitable switch arm 37, which surrounds the central lock. The front face of the combined lock and switch is provided with four markings, namely "Off position," 38, "Day position" 39, "Night position" 40, and "Parking position" 41. Mounted upon the housing of the switch is an insulating disk 42 which carries certain contact points hereinafter described. Arranged in the lateral direction indicating compartments 5 and 6 are lights 43 and 44, each being of twenty-one candle-power. Arranged in the lower compartment 7 is a similar light 45 for illuminating the tail-light.

In Figs. 13 to 18, respectively, is shown diagrammatically the operation of the switches for completing the different circuits, the connections of which are as follows:—The tail-light 45 is connected by a wire 46 to a contact point 47 carried upon disk 42. The right turn light 44 is connected by wire 48 to a contact point 49 carried by the disk 42. The left turn light 43 is connected by a wire 50 to a contact 51 carried by the disk 42. The pilot-light 26 is connected to one side of the battery 50', and by a wire 52 to a central contact point 53 carried by the disk 42. The other end of the battery is grounded to the machine as well as the other side of all of the lights mentioned. Carried upon the disk 42 are two contacts 54 and 55. The contacts 49, 51 and 55 are adapted to register with contact-members 56 and 57 carried by the disk 35 of the switch, while the contact points 47 and 54 are adapted to register with the contact points 33 and 34 of the switch carried by the inner rotatable disk 31'. The central contact member 32 of the rotary disk 31' is permanently in engagement with the contact member 53 carried by the disk 42.

As illustrated in Fig. 13, the inner disk 31' has been turned to what may be termed for "day running" where it is only desirable to actuate the right and left turn signals. In Fig. 13, the position of the switch members 31' and 35 is shown to effect a circuit for a right turn. In this case, the circuit leads from the battery to the pilot-light 26, to the central contact point 53, thence to the contact point 32, thence to the contact points 33 and 54 which is metallically connected with the contact point 55, the latter being connected with the contact point 49 by means of the contact member 56, thus completing the circuit to the right turn light 44 through the wire 48.

When making a left turn, the central switch 31' retains its position, and the outer disk 35 is rotated in a clockwise direction, bringing the contact member 57 around into registry at one end with the contact member 55 as shown in Fig. 14, the opposite end of the member 57 contacting with the contact member 51 which completes the circuit through the wire 50 to the left turn lamp 43.

When running, at night, the central switch is turned to night position, which brings the disk 31' into such a position that the contact member 34 now registers with the contact member 54 and maintains the right and left turn connections as just described. The contact point 33, however, as illustrated in Figs. 15 and 16 is turned to register with the contact member 47 carried by the disk 42, and establishes a permanent connection to the tail-light 45, this remaining permanent while the right and left turn switch may be turned at will to effect the circuits illustrated.

When parking, the central switch is turned to parking position, which, as illustrated in Fig. 17, turns the disk 31' to such a position that the contact member 34 registers with the contact 47 only, thereby completing a circuit from the battery through the pilot-light 26, wire 52, the central contact 53 carried by the disk 42, through the switch contact 32, thence through the contact 34 to the contact point 47 carried by the disk 42, and by wire 46 to the tail-light 45. It will be noted in this position that the contact member 33 which distributes from the central switch the current for the actuation of the right and left turn lights is out of contact, therefore the right and left turn lights cannot be illuminated while parking. In this position, owing to difference in candle-power of the pilot-light, which is thirty-two candle-power and the tail-light which is four candle-power and in series, the pilot-light will not be illuminated when parked. However, it may be stated that at all other times when the arrow direction lights, which are of twenty-one candle-power, are in series with the pilot-light, both will be illuminated. As shown in diagram in Fig. 18, the central disk 31' is turned to off position, which brings the two contact points 33 and 34 out of registry with either the contact member 54 which distribute the current to the right and left turn lights, or to the contact member 47 which distribute current to the tail-light. In this position neither the arrows nor tail-light will be illuminated.

In the circuits disclosed in Figs. 13 and 14, it will be observed that the pilot-light is of thirty-two candle-power, and that the right and left turn lights are of twenty-one candle-power, therefore the pilot-light will burn dim and the arrow-lights very bright. In the night running, however, we have the pilot-light, which is thirty-two candle-power, in series in one instance with the tail-light of four candle-power, and the pilot-light will not light with the tail-light ordinarily; but, when the switch-arm 37 is keyed to turn on either the right or left arrow lights, we then have the pilot-light of thirty-two candle-power in series with the arrow lights of twenty-one candle-power, in which instance the pilot-light will be illuminated in series with the arrow lights, and will indicate to the operator whether or not these lights are functioning. The pilot-light further acts as a signal to the operator if, after making a turn, he has neglected to turn the pilot-light switch 37 to neutral.

It will thus be seen that in this invention there is combined a tail-light, a license-plate, illuminating arrangement, and a direction indicating device which may be electrically operated from the seat by the driver, the arrangement being constructed as a whole in a very simple and efficient manner, and one which is perfectly reliable and practically fool-proof, having provided a pilot-light which insures the operator that the several signals are working properly.

We claim:—

1. A signal device including a casing having central and lateral compartments therein, a wall of said casing being provided with a plurality of indicating openings communicating with the several compartments, a lens for each of said compartments, and means for permitting the lateral lenses to be inserted only through the central opening and held against removal by the central lens when in position.

2. A signal device including a casing having central and lateral compartments therein, a wall of said casing being provided with a plurality of indicating openings communicating with the several compartments, a lens for each of said compartments, the lateral compartments having openings communicating with the central compartment for receiving the lateral lenses through said central compartment, and means for normally closing the outer edges of the lateral compartments except at said openings to permit the insertion of the lateral lenses only through the communicating openings.

3. In a signal device, a light casing having a central compartment, and lateral compartments, a cover for closing said casing, said cover being provided with a plurality of indicating openings communicating with the several compartments, the central opening adapted to receive a tail-light lens, the lateral openings having end openings communicating with the central opening whereby translucent slides may be inserted through the central opening into the lateral openings, the tail-light lens serving to retain said translucent slides against removal, and means for normally embracing the lateral lenses at the outer edges thereof except at said end openings.

4. In a signal device, a light casing having a central compartment, and lateral compartments, a cover for closing said casing, said cover being provided with a plurality of indicating openings communicating with the several compartments, the central opening adapted to receive a tail-light lens, the lateral openings having end openings communicating with the central opening whereby colored translucent slides may be inserted through the central opening into the lateral openings, the tail-light lens serving to retain said translucent slides against removal a light in the lower central compartment communicating with the upper compartment, individual lights in the lateral lower compartments, and means for normally embracing the lateral lenses at the outer edges thereof except at said openings to permit the insertion of said lateral lenses only through said end opening.

5. In a signal device, a light-casing having a central compartment and lateral compartments, a cover for closing said compartments and provided with a plurality of indicating openings communicating with the several compartments, the openings of the central and lateral compartments being in the same plane, and communicating with each other, a plurality of lenses for said compartments, the lateral lenses being inserted through the communications with the central compartment, and being held against removal by the central lenses, and means for normally embracing the lateral lenses at the outer edges thereof except at said communicating openings to permit the insertion of said lenses only through said communicating openings.

6. In a signal device, a light-casing having a central compartment, lateral compartments aligned with the central compartment, a cover for said compartments, said cover being provided with a plurality of indicating openings, communicating with the several compartments, an annular groove in said cover adapted to receive the tail-light lens of the central compartment, spaced upper and lower horizontal grooves in said cover adapted to receive a translucent lens for each of said lateral compartments, the annular and horizontal grooves being in the same plane and communicating whereby the lens of the central compartment is adapted to retain the lens of the lateral compartment against removal, and means connected with said cover for closing the outer ends of said horizontal grooves and compartments.

In testimony whereof we affix our signatures.

PATRICK J. McMANAMAN.
JULIUS NAMET.